G. B. MONROE.
HYDROCARBON BURNER.
APPLICATION FILED NOV. 26, 1917. RENEWED JAN. 11, 1919.

1,295,349.

Patented Feb. 25, 1919.
2 SHEETS—SHEET 1.

Inventor
George B. Monroe.

By Herbert E. Smith
Attorney

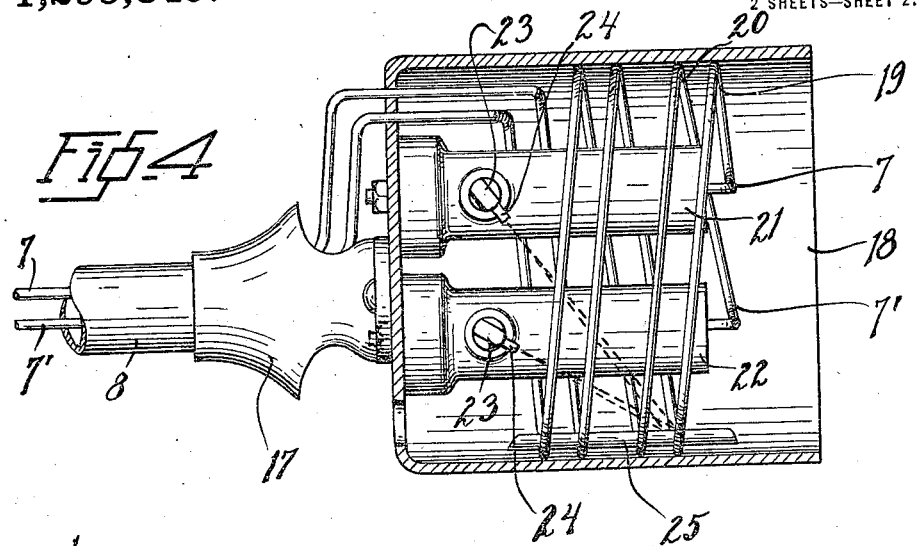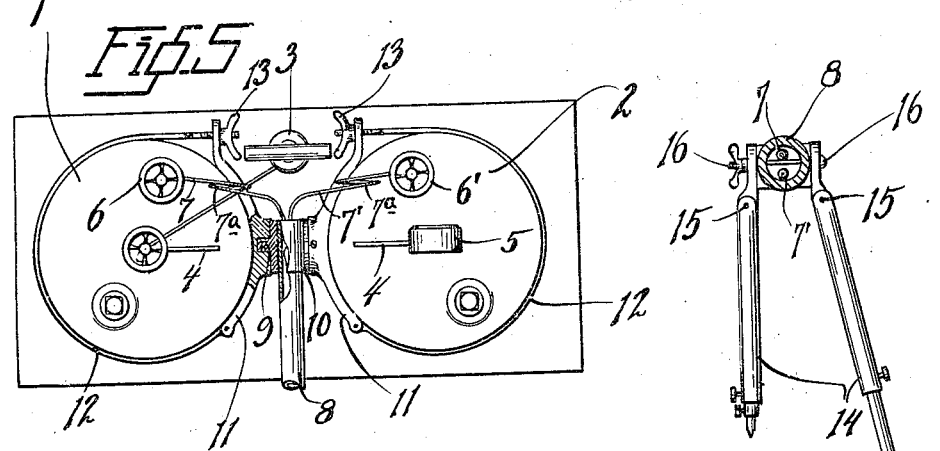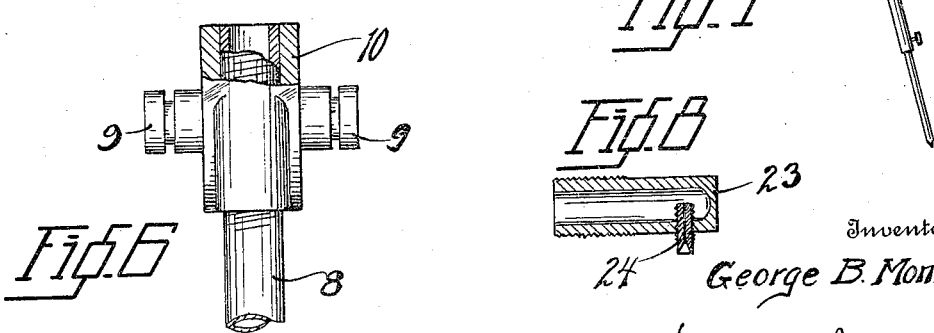

UNITED STATES PATENT OFFICE.

GEORGE B. MONROE, OF SPOKANE, WASHINGTON, ASSIGNOR TO JAMES A. WELCH, OF SPOKANE, WASHINGTON.

HYDROCARBON-BURNER.

1,295,349.      Specification of Letters Patent.      Patented Feb. 25, 1919.

Application filed November 26, 1917, Serial No. 204,039. Renewed January 11, 1919. Serial No. 270,751.

*To all whom it may concern:*

Be it known that I, GEORGE B. MONROE, a citizen of the United States, residing at Spokane, county of Spokane, and State of Washington, have invented certain new and useful Improvements in Hydrocarbon-Burners, of which the following is a specification.

The present invention relates to improvements in hydrocarbon burners, designed especially for use in burning or firing tree stumps when clearing the ground of trees.

The customary method at present in vogue is to pile inflammable material about the tree stump to be burned, after having bored or drilled holes in the stump to form flues or passages so that the flames may penetrate the interior of the stump, and thus more quickly consume the tree stump. The flues in the stump, which usually open at the ground, or into a recess dug below the ground line, form draft passages for the flames to enter from the fire built about the stump, and of course the flames consume the interior as well as the exterior of the stump.

The primary object of the present invention is to provide a burner which may be handled quickly and with facility, which is simple both in construction and operation, and which will direct the flame into the holes in the stump with intensity in order that the stump may be quickly consumed. The burner device may of course be used in conjunction with the usual pile of inflammable material, or in some instances, may be utilized exclusively of other firing means.

Fig. 4 is an enlarged, detail, sectional view of the shield or shell of the burner, showing also water and hydrocarbon vaporing coils, generating chambers, and burner nozzles.

Fig. 5 is an enlarged top plan view showing the oil and water tanks, and especially the flexible connections thereto of the casing or tube for supporting the oil and water supply pipes.

Fig. 6 is an enlarged detail of the connection of parts between the two tanks.

Fig. 7 is an enlarged detail view of the adjustable supports or telescopic legs for the casing.

Fig. 8 is a sectional detail view of one of the several burner nozzles and tip.

Figure 1:
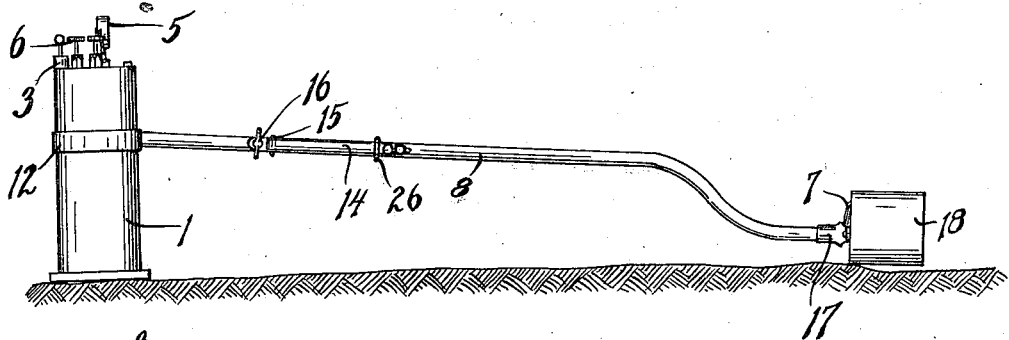
Figure 1 is a side view of a burner device constructed and operated according to the present invention.

In the preferred embodiment of the invention as illustrated in the drawings, a pair of cylindrical, closed metallic tanks of usual construction are employed, tank designated 1 being for hydrocarbon, as kerosene, and tank 2 being a container for water. A hand pump 3 is preferably utilized to create pressure of air in the tanks, and the connecting pipe 4 furnishes an equalized pressure in both tanks, the gage 5 being employed to indicate the pressure as usual.

The hand wheels 6 and 6' are parts of regulating valves to control the supply of kerosene and water through the supply pipes 7 and 7' respectively, which are connected to the tanks in suitable manner and provided with flexible portions or bends 7ª before they enter the open end of the tubular casing or large pipe 8. In order that this casing and its contained supply pipes may move relatively to the two tanks, a flexible or hinged joint is provided through the instrumentality of the pair of trunnions 9 9 projecting from the sleeve 10 fixed on the end of the casing and into which the supply pipes enter, as in Fig. 5.

The trunnions are supported between the adjoining tanks by means of a pair of straps 11, 11, curved to conform to the periphery of the tanks and each formed with an annular rod or bar 12 pivoted to the strap, and formed at its free end with threads to receive a wing nut as 13. The threaded end of the bar is passed through the free end of the strap, and the wing nut is employed to clamp the entire strap and rod on the tank as will readily be understood. Thus the casing and contaned supply pipes may be swung on a pivot relatively to the tanks, and by this means the casing may be adjusted to suit different circumstances and conditions.

To support the casing and supply pipes, an adjustable support is fashioned of a pair of telescopic legs 14, laterally swiveled at 15, and hinged at 16 longitudinally of the casing, so that the legs may be lengthened or shortened independently of each other, and may be swung either laterally or longitudinally, independently of each other, to adapt them to the irregularities of the ground and hold the casing supply pipes and burner in adjusted position.

The remote or free end of the casing is fashioned with a head 17 provided with openings for the supply pipes 7 and 7', and having attached thereto the cylindrical shell or shield 18, of metal, and provided with an open mouth. The supply pipes 7 and 7' are introduced into the shield through perforations in its head, and within the shield the pipes are coiled about its walls, as indicated at 19 and 20 to form respectively vaporizing coils for the kerosene and water from their tanks. Within the shell or shield and secured to the head thereof, are a pair of vessels 21 and 22 forming generating chambers for gas and steam, and each of the chambers is formed or provided with an emission nozzle 23 made of a threaded, hollow plug, and perforated to receive the jet-head or tip 24 threaded therein. A flash plate 25, preferably of copper is fixed within the coils in the shell, and it will be seen that the coils encircle the generating chambers and have their convolutions located adjacent the interior wall of the shell.

Figure 2:
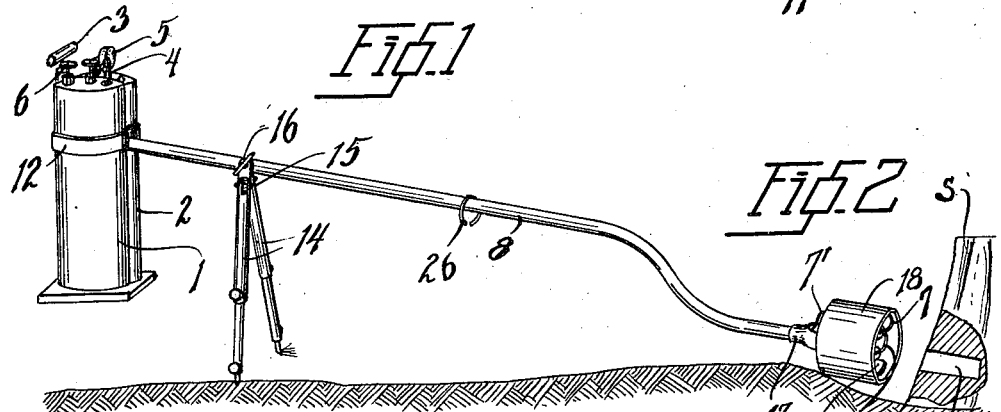
Fig. 2 is a view, illustrating the application of the invention to a tree stump, telescopic supports or legs being brought into use to hold the burner in fixed position to the opening bored in the stump of the tree.
Figure 3:
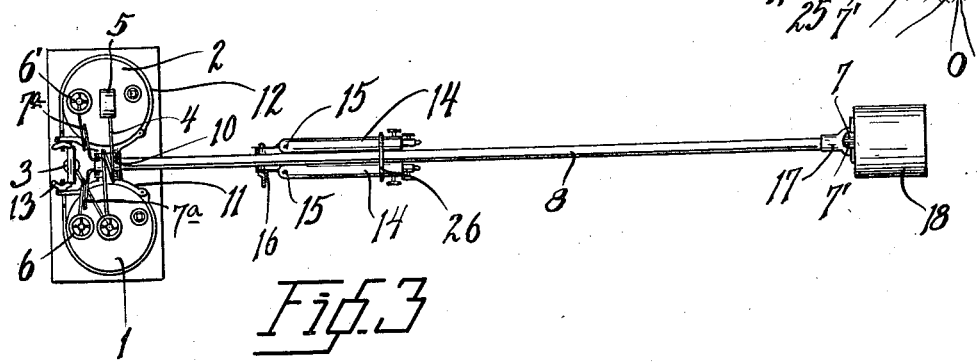
Fig. 3 is a top plan view of the device with the swiveled telscopic legs folded in position out of use as in Fig. 1.

The fuel elements, from their respective generating chambers, may be directed as indicated by the dotted lines in Fig. 4, upon the flash plate, and as will be readily understood, the heat in the shell vaporizes the kerosene and water in their coils, and maintains the vaporized condition of the fuel elements in their generating chambers, so that the spray or jet of gas and steam, coming from the tips in blasts form an intensely hot torch which may be directed into the opening O in the tree stump S as in Fig. 2.

The construction having been explained, it will be readily apparent that the operation of the apparatus is simple, and facile, as before indicated.

The air pressure in the two tanks is brought to the desired degree, and the fuel ingredients or elements are forced under pressure through their supply pipes to the coils in the burner shell, and a priming fire may be lighted to heat the vaporizing coils and generating chambers, and the nozzles, which have been previously adjusted to direct their blasts at the required point on the flash plate are then ready to furnish the blast in usual manner.

The number of nozzles and tips may be varied to furnish various degrees of heat, and the tips may be adjusted in the nozzles by turning on their threads. It will be noted that the tip projects well within the interior of the nozzle so that sediment or extraneous matter that may settle in the bottom of the nozzle is not likely to clog up the tip opening within the nozzle, and should such stoppage occur, the passage may be opened with a fine wire. When the burner is directed toward an opening near the roots of the stump as in Fig. 2, wherein a recess of the stump has been dug about the stump, the burner is maintained at its desired angle by the utilization of the adjustable support or telescopic legs, and of course when the legs or supports are not in use they are folded up to the tubular casing and may be suspended by the ring 26 thereon.

Claims.

1. The combination in a burning apparatus of a pair of fuel tanks and a supply pipe from each, a tubular casing pivotally connected with the tanks and inclosing said pipes, a foldable support for the casing having independently adjustable legs and a burner device at the free end of said casing receiving fuel elements through the pipes.

2. The combination in a burning apparatus of a pair of fuel element tanks having supply pipes, a tubular casing pivotally connected with the tanks and inclosing said pipes, means for supporting the casing, and a burner device at the free end of the casing receiving fuel elements through the pipes.

3. The combination in a burner apparatus of a pair of fuel-element tanks having supply pipes, a tubular casing pivoted to the tanks and inclosing said pipes, a shell at the free end of the casing, and burner parts within said shell to receive the fuel elements from the pipes.

In testimony whereof I affix my signature.

GEORGE B. MONROE.